(12) United States Patent
Albert et al.

(10) Patent No.: US 9,940,085 B2
(45) Date of Patent: Apr. 10, 2018

(54) METHOD, DEVICE AND SYSTEM FOR DISPLAYING A VERTICAL FLIGHT PROFILE OF AN AIRCRAFT

(71) Applicant: Airbus Operations (SAS), Toulouse (FR)

(72) Inventors: Nicolas Albert, Salvetat Saint Gilles (FR); Thomas Pastre, Toulouse (FR); Thomas Koebel, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 197 days.

(21) Appl. No.: 15/145,932

(22) Filed: May 4, 2016

(65) Prior Publication Data

US 2016/0357488 A1 Dec. 8, 2016

(30) Foreign Application Priority Data

May 4, 2015 (FR) ...................................... 15 53959

(51) Int. Cl.
*G06F 3/048* (2013.01)
*G06F 3/14* (2006.01)
(Continued)

(52) U.S. Cl.
CPC ............... *G06F 3/14* (2013.01); *B64D 43/00* (2013.01); *G01C 23/005* (2013.01);
(Continued)

(58) Field of Classification Search
CPC ..................................................... B64D 43/00
(Continued)

(56) References Cited

U.S. PATENT DOCUMENTS

| 5,445,021 A | 8/1995 | Cattoen et al. |
| 6,038,498 A | 3/2000 | Briffe et al. |
| (Continued) | | |

FOREIGN PATENT DOCUMENTS

| EP | 2405417 | 1/2012 |
| FR | 2689231 | 10/1993 |
| (Continued) | | |

OTHER PUBLICATIONS

French Search Report, dated Feb. 24, 2016, priority document.

*Primary Examiner* — William Titcomb
(74) *Attorney, Agent, or Firm* — Greer, Burns & Crain Ltd.

(57) ABSTRACT

A display method comprises a step during which an aircraft flight management computer sends display instructions to a display management system, to control the display of an aircraft flight plan window. The display method also comprises steps comprising acquiring a reference point and a vertical flight profile of the aircraft comprising the reference point, and computing, using the vertical flight profile, an altitude of the reference point. It also comprises steps comprising acquiring an information item relating to a flight phase associated with the reference point, acquiring an information item relating to a selected display range, determining a vertical centering coefficient of a display window relating to the vertical flight profile, as a function of the flight phase and transmitting, to the display management system, instructions for displaying the display window as a function of the altitude of the reference point and of the centering coefficient of the display window.

12 Claims, 7 Drawing Sheets

(51) Int. Cl.
  *G06F 3/0482*    (2013.01)
  *G09G 5/38*      (2006.01)
  *G08G 5/00*      (2006.01)
  *B64D 43/00*     (2006.01)
  *G01C 23/00*     (2006.01)

(52) U.S. Cl.
  CPC ........... *G06F 3/0482* (2013.01); *G08G 5/003* (2013.01); *G09G 5/38* (2013.01); *G09G 2340/0485* (2013.01); *G09G 2380/12* (2013.01)

(58) Field of Classification Search
  USPC ....................................................... 715/788
  See application file for complete search history.

(56) References Cited

U.S. PATENT DOCUMENTS

| | | | |
|---|---|---|---|
| 6,505,102 B2 | 1/2003 | Morizet et al. | |
| 2003/0048204 A1 | 3/2003 | Qureshi | |
| 2012/0010765 A1 | 1/2012 | Wilson et al. | |
| 2012/0143487 A1* | 6/2012 | Giovannini | G08G 5/0021 701/301 |
| 2012/0143505 A1* | 6/2012 | Giovannini | G08G 5/0052 701/540 |
| 2012/0150369 A1* | 6/2012 | Giovannini | G08G 5/0021 701/18 |
| 2014/0343763 A1* | 11/2014 | Koebel | B64D 45/00 701/14 |
| 2015/0204675 A1* | 7/2015 | Albert | G08G 5/0039 701/400 |
| 2015/0310746 A1* | 10/2015 | Albert | G08G 5/0047 701/3 |
| 2015/0314854 A1* | 11/2015 | Albert | B64C 13/04 701/3 |
| 2015/0339241 A1* | 11/2015 | Warner | G06F 13/10 710/74 |
| 2016/0209234 A1* | 7/2016 | Passinger | B64D 43/00 |

FOREIGN PATENT DOCUMENTS

| | | |
|---|---|---|
| FR | 2822944 | 10/2002 |
| FR | 2895793 | 7/2007 |
| NO | 33023734 | 3/2003 |

\* cited by examiner

METHOD, DEVICE AND SYSTEM FOR DISPLAYING A VERTICAL FLIGHT PROFILE OF AN AIRCRAFT

CROSS-REFERENCES TO RELATED APPLICATIONS

This application claims the benefit of the French patent application No. 1553959 filed on May 4, 2015, the entire disclosures of which are incorporated herein by way of reference.

BACKGROUND OF THE INVENTION

The invention relates to a method, a device and a system for displaying a vertical flight profile of an aircraft, and to an aircraft comprising such a device or such a system.

Aircraft, in particular passenger transport airplanes and military transport airplanes, comprise a flight management computer of FMS (flight management system) type. Generally, before a take-off of the aircraft, in a flight preparation phase or in a mission preparation phase of the aircraft, a pilot enters a flight plan into the FMS computer, this flight plan comprising a series of waypoints corresponding to the planned trajectory of the aircraft. A screen of the cockpit of the aircraft, associated with the FMS computer, enables the pilot to view the flight plan configured in the FMS computer and the pilot can, if necessary, modify this flight plan. Moreover, independently of this flight preparation phase, during the flight of the aircraft, the pilot has, in the cockpit, a navigation screen (navigation display), a first window of which displays a representation of the current flight plan of the aircraft in plan view in a horizontal plane and a second window, generally called VD (vertical display), displays a vertical flight profile in vertical plane along a trajectory of the aircraft corresponding to the current flight plan. The display of a window of VD type is notably illustrated by the documents FR 2,689,231 and FR 2,822,944. This second window comprises a y axis graduated by altitude, on which is displayed a symbol representing the aircraft at its current altitude, and an x axis graduated by distance from the current position of the aircraft. This window also comprises a plot representing the vertical trajectory of the aircraft along the flight plan, in front of the current position of the aircraft.

In the flight preparation phase or the mission preparation phase of the aircraft, it would be advantageous for the pilot to be able to view the vertical profile corresponding to the flight plan configured in the FMS computer, and to do so for the entire length of the flight plan, so as to be able to view the height margins relative to the terrain flown over or relative to altitude constraints. It would therefore be advantageous to have, during the flight preparation phase or the mission preparation phase of the aircraft, a display similar to a display of VD type. One problem which arises for the production of such a display relates to the vertical centering of the display window as a function of the part of the flight plan that the pilot wants to view. The document FR 2,895,793 describes a method for centering a window of VD type during the flight of a military transport aircraft. However, to determine the centering, this method uses information items relating to the current situation of the aircraft, notably the current position of the aircraft. It cannot therefore be transposed to the viewing of a part of the flight plan which would not be situated immediately in front of the aircraft, as in the case envisaged of a flight preparation phase or a mission preparation phase of an aircraft.

SUMMARY OF THE INVENTION

The aim of the present invention is notably to provide a solution to these problems. It relates to a method for displaying a vertical flight profile of an aircraft, this aircraft comprising:
 a display management system comprising at least one display screen in a cockpit of the aircraft,
 a flight management computer of the aircraft; and
 a human-machine interface device,
 the method comprising a step during which the flight management computer sends display instructions to the display management system, to control the display of a window relating to a flight plan of the aircraft on a screen of the cockpit.

This method is noteworthy in that it comprises the following steps implemented by a device for displaying the vertical flight profile of the aircraft:
 a) acquiring, from the flight management computer of the aircraft, a reference point selected using the human-machine interface device from a plurality of waypoints of the flight plan of the aircraft;
 b) acquiring, from the flight management computer of the aircraft, a vertical flight profile of the aircraft comprising the reference point;
 c) computing, using the vertical flight profile, an altitude of the reference point;
 d) acquiring, from the flight management computer of the aircraft, at least one information item relating to a flight phase associated with the reference point;
 e) acquiring at least one information item relating to a selected display range;
 f) determining a vertical centering coefficient of a display window relating to the vertical flight profile of the aircraft, as a function at least of the information item relating to the flight phase associated with the reference point, the vertical centering coefficient corresponding to a vertical centering of the reference point in the display window; and
 g) transmitting, to the display management system, instructions for displaying the display window on this at least one display screen of the cockpit of the aircraft, these instructions comprising information items for displaying the vertical flight profile of the aircraft as a function at least of the altitude of the reference point and of the vertical centering coefficient of the display window.

Thus, by virtue of this method, the pilot of the aircraft can view, in a window displayed on a screen of the cockpit, the flight plan configured in the FMS computer while viewing, in another window, the vertical flight profile about a selected waypoint in the flight plan. The pilot can therefore navigate along the flight plan by selecting, in succession, the various points of the flight plan by means of the human-machine interface, while viewing the corresponding vertical flight profile. That enables the pilot to check all of the vertical flight profile, in particular before the take-off of the aircraft. Furthermore, by virtue of this method, during the flight of the aircraft, the pilot can also check the vertical flight profile corresponding to a future waypoint, for example when the pilot wants to prepare a landing phase during a cruising flight phase of the aircraft. The method offers the advantage of allowing for an optimized vertical centering of the display window of the vertical flight profile, adapted to the selected waypoint.

According to particular embodiments that can be taken into account in isolation or in combination:

the vertical centering coefficient is determined by selection from a set of predetermined vertical centering coefficients;

in the step f), the vertical centering coefficient is determined, also, as a function of a slope associated with the reference point, this slope being computed as a function of the vertical flight profile acquired in the step b);

the step d) further comprises the acquisition, from the flight management computer of the aircraft, of at least one information item relating to an altitude constraint of the vertical flight profile of the aircraft and, in the step f), the vertical centering coefficient is determined, also, as a function of the altitude constraint;

the step g) further comprises the transmission, to the display management system, of at least one information item relating to the horizontal centering of the display window relative to the reference point;

the device for displaying the vertical flight profile of the aircraft is incorporated in the flight management computer of the aircraft;

the flight management computer of the aircraft is configured to send display instructions to the display management system, to control the display of a window relating to a horizontal flight profile of the aircraft on a screen of the cockpit.

The invention also relates to a device for displaying a vertical flight profile of an aircraft, this aircraft comprising:
a display management system comprising at least one display screen in a cockpit of the aircraft,
a flight management computer of the aircraft; and
a human-machine interface device,
the flight management computer being configured to send display instructions to the display management system, so as to control the display of a window relating to a flight plan of the aircraft on a screen of the cockpit.

The device is noteworthy in that it is configured to implement the following steps:

a) acquiring, from the flight management computer of the aircraft, a reference point selected using the human-machine interface device from a plurality of waypoints of the flight plan of the aircraft;

b) acquiring, from the flight management computer of the aircraft, a vertical flight profile of the aircraft comprising the reference point;

c) computing, using the vertical flight profile, an altitude of the reference point;

d) acquiring, from the flight management computer of the aircraft, at least one information item relating to a flight phase associated with the reference point;

e) acquiring at least one information item relating to a selected display range;

f) determining a vertical centering coefficient of a display window relating to the vertical flight profile of the aircraft, as a function at least of the information item relating to the flight phase associated with the reference point, the vertical centering coefficient corresponding to a vertical centering of the reference point in the display window; and g) transmitting, to the display management system, instructions for displaying the display window on this at least one display screen of the cockpit of the aircraft, these instructions comprising information items for displaying the vertical flight profile of the aircraft as a function at least of the altitude of the reference point and of the vertical centering coefficient of the display window.

In one embodiment, the device is incorporated in the flight management computer of the aircraft.

The invention also relates to a system for displaying a vertical flight profile of an aircraft, this system comprising:
a display management system of the aircraft, comprising at least one display screen in a cockpit of the aircraft,
a flight management computer of the aircraft; and
a human-machine interface device,
the flight management computer being configured to send display instructions to the display management system, so as to control the display of a window relating to a flight plan of the aircraft on a screen of the cockpit.

The system is noteworthy in that it comprises a device for displaying a vertical flight profile as mentioned above.

The invention also relates to an aircraft comprising a display management system comprising at least one display screen in a cockpit of the aircraft, a flight management computer of the aircraft, a human-machine interface device and a device for displaying a vertical flight profile as mentioned above. The invention also relates to an aircraft comprising a system for displaying a vertical flight profile as mentioned above.

BRIEF DESCRIPTION OF THE DRAWINGS

The invention will be better understood on reading the following description and on studying the attached figures.

DETAILED DESCRIPTION OF THE PREFERRED EMBODIMENTS

Figure 1:
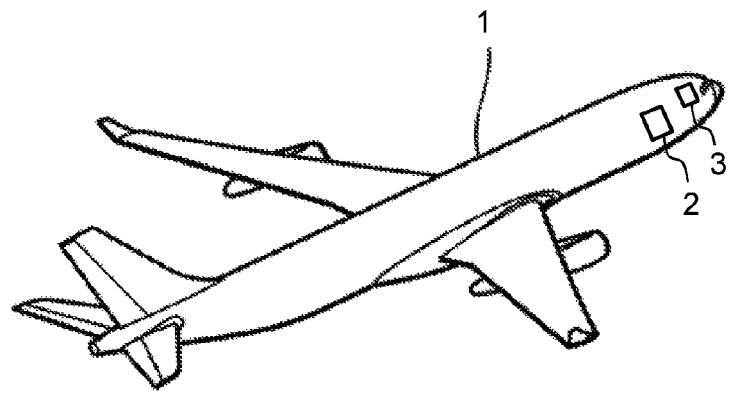
FIG. 1 illustrates, in a simplified manner, an aircraft comprising a cockpit.

The aircraft 1 represented in FIG. 1 comprises a flight management computer 12 of FMS (flight management system) type and a display management system 16 of CDS (control and display system) type comprising at least one display screen 18 of DU (display unit) type in a cockpit 3 of the aircraft. The aircraft also comprises a human-machine interface device 14 HMI, for example of MCDU (multi-functional control and display unit) type or of KCCU (keyboard cursor control unit) type. The human-machine interface device 14 is associated with the display management system 16 so as to allow an operator, in particular a pilot of the aircraft, to interact with the display management system.

Figure 2:
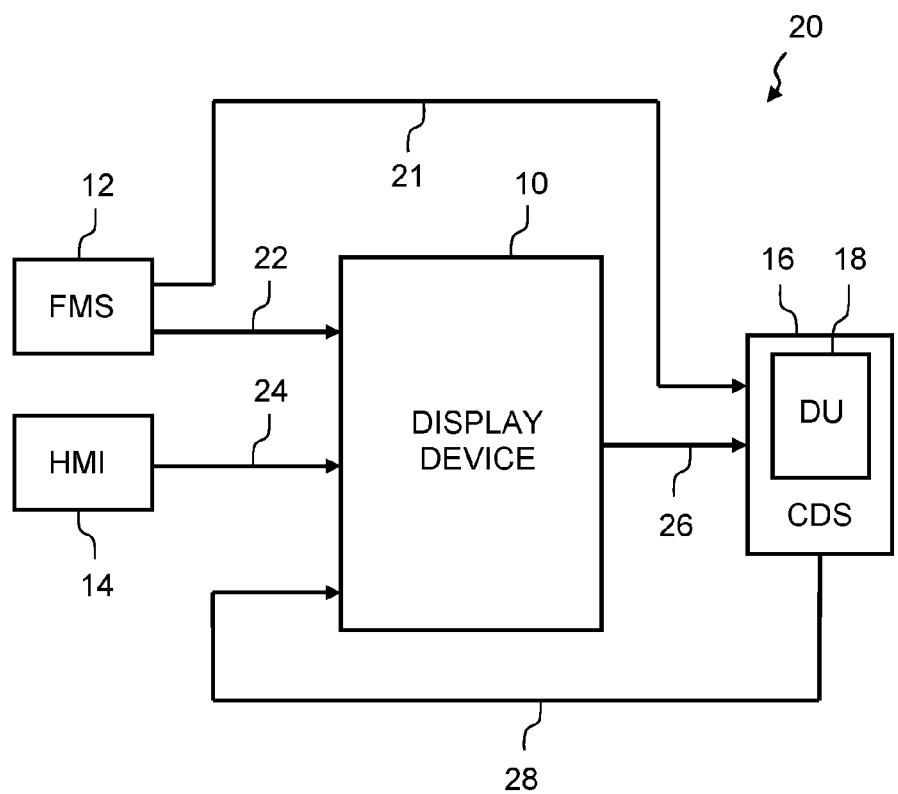
FIG. 2 represents a system for displaying a vertical flight profile of the aircraft, in accordance with an embodiment of the invention.

The system 20 for displaying a vertical flight profile of the aircraft, represented in FIG. 2, comprises a device 10 for displaying a vertical flight profile of the aircraft, the flight management computer 12, the display management system 16 and the human-machine interface device 14. The device 10 for displaying a vertical flight profile of the aircraft is linked at the input to the flight management computer 12 by a link 22, to the human-machine interface device 14 by a link 24 and to the display management system 16 by a link 28. The device 10 for displaying a vertical flight profile of the aircraft is linked at the output to the display management system 16 by a link 26. The flight management computer 12 is linked at the output to the display management system 16 by a link 21. According to an advantageous embodiment, the various links can form part of a communication network of the aircraft, in particular a deterministic switched Ethernet communication network conforming to the ARINC 664 part 7 standard corresponding for example to an AFDX® communication network. According to another embodiment, these links can be of ARINC 429 type. The device 10 for displaying a vertical flight profile comprises a processor or a microprocessor. It can notably correspond to a computer incorporated in an avionics bay 2 of the aircraft 1. The flight management computer 12 and the display management system 16 can also be incorporated in the avionics bay.

In operation, when an operator, in particular a pilot of the aircraft, wants to view the characteristics of a flight plan stored in the flight management computer 12, this pilot uses the human-machine interface device 14 to request a display corresponding to this flight plan. In the usual manner, the flight management computer 12 sends display instructions to the display management system 16, via the link 21, to control the display of a window relating to the flight plan of the aircraft on a screen of the cockpit. This window notably displays a set of consecutive waypoints corresponding to the flight plan. The pilot can view information associated with these waypoints. For that, he or she selects, using the human-machine interface device 14, a waypoint for which he or she wants to view these information items. The flight management computer 12 then transmits the corresponding information items to the display management system 16 which displays them on the screen.

Figure 3:
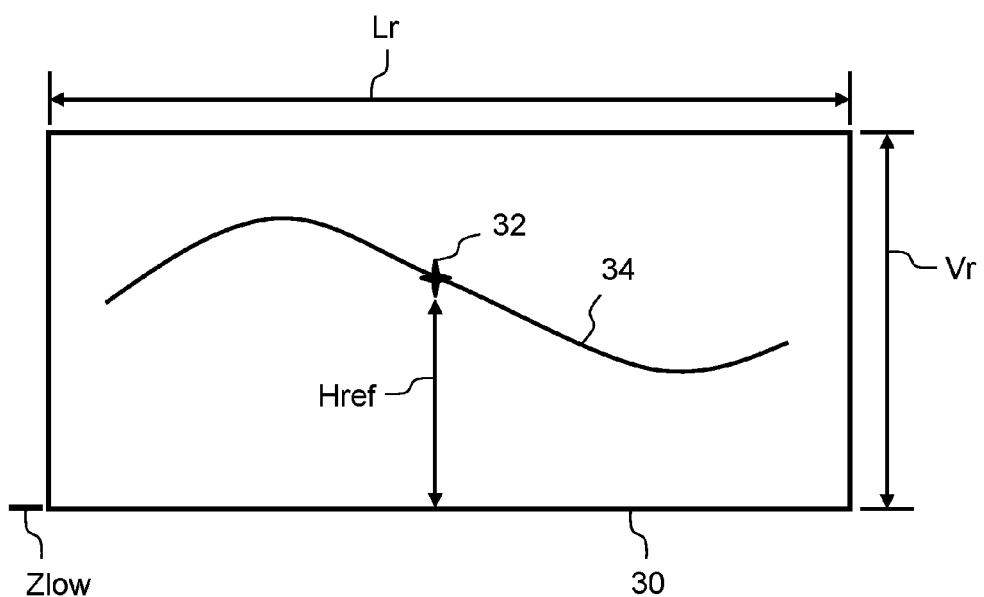
FIG. 3 illustrates an example of window for displaying the vertical flight profile on a screen of the cockpit of the aircraft.

In accordance with the embodiment of the invention, when the pilot selects a waypoint of the flight plan to view the information items associated with this waypoint, the flight management computer transmits this waypoint to the device 10 for displaying a vertical flight profile, via the link 22. The device 10 for displaying a vertical flight profile is configured to acquire this waypoint. It uses this waypoint as reference point to determine the display of the vertical flight profile of the aircraft. The device 10 for displaying a vertical flight profile then makes the acquisition, via the link 22, of a vertical flight profile of the aircraft comprising the reference point. According to a variant, this vertical flight profile corresponds to the entire vertical flight profile associated with the flight plan. According to another variant, this vertical flight profile corresponds to only a part of the vertical flight profile associated with the flight plan, but this part must however be sufficient to determine the display. Using the vertical flight profile received from the flight management computer 12, the device 10 for displaying a vertical flight profile computes an altitude corresponding to the reference point. Given that the vertical flight profile comprises the reference point, the knowledge of the vertical flight profile enables the device 10 to compute this altitude. Furthermore, the device 10 for displaying a vertical flight profile makes the acquisition, via the link 22, of a flight phase information item associated with the reference point. It also makes the acquisition, via the link 28, of an information item relating to a display range selected by the pilot, this information item being supplied by the display management system 16. In particular, this display range can correspond to a level of zoom of the display or to a display range directly defined by a distance. Based on the flight phase information item associated with the reference point, the device 10 determines a coefficient K of vertical centering of a display window relating to the vertical flight profile of the aircraft. The coefficient K lies within the interval [0; 1] and it corresponds to a vertical centering of the reference point in the display window. This vertical centering is illustrated by FIG. 3 in which the display range of the display window 30 is represented by a vertical display range Vr (vertical range) and by a lateral display range Lr (lateral range). When the display range corresponds to a level of zoom, a pair of values (Lr, Vr) is defined as a function of the level of zoom. When the display range corresponds to a distance, according to a first variant, the lateral display range Lr is equal to this distance (for example 20 NM, i.e., approximately 36 km) and the vertical display range Vr is predefined as a function of the lateral display range. According to a second variant, the lateral display range Lr is equal to a first distance (for example 20 NM, i.e., approximately 36 km) and the vertical display range Vr is defined by a second distance, namely a height (for example 5000 feet, i.e., approximately 1500 m), the first and second distances being selected by the pilot. A symbol representing the reference point 32 is situated on a curve 34 illustrating the vertical flight profile in the window 30. The height Href of the reference point 32 relative to the altitude corresponding to the bottom of the display window 30 is such that:

$$Href = K \times Vr$$

Consequently, when K=0, Href=0, therefore the reference point 32 is situated at the bottom of the window 30; when K=1, Href=Vr, therefore the reference point 32 is situated at the top of the window 30. Thus, the choice of a value of the coefficient K determines the height Href of the reference point 32 relative to the bottom of the display window and therefore the vertical centering of the reference point in the display window.

The altitude Zlow corresponding to the bottom of the window 30 can be computed by using the equation:

$$Zlow = Zref - Href$$

in which Zref is the altitude of the reference point 32 computed by the device 10 for displaying a vertical flight profile. Consequently:

$$Zlow = Zref - K \times Vr.$$

Given that the vertical flight profile comprises the reference point 32, the determination of the vertical centering of the reference point 32 in the display window 30 makes it possible to define the vertical centering of the curve 34 representing the vertical flight profile in the display window.

The device 10 for displaying a vertical flight profile transmits, via the link 26, to the display management system 16, instructions for displaying the display window 30 on the screen 18 of the cockpit of the aircraft. These instructions comprise information items for displaying the vertical flight profile 34 of the aircraft. Given that the vertical centering of the vertical flight profile 34 in the window 30 is produced as indicated previously, these display information items are a function of the altitude of the reference point 32 and of the centering coefficient K of the display window.

Different variants can be envisaged for the lateral centering of the reference point 32 in the window 30. For example, as represented in FIG. 3, the reference point 32 can be situated substantially in the middle of the display window 30, along a direction corresponding to its lateral range Lr. Such a lateral centering enables the pilot to view the vertical flight profile both upstream and downstream of the selected reference point.

In one embodiment, the coefficient K is chosen from a set of predetermined vertical centering coefficients, as a function notably of the flight phase associated with the reference point. In particular, the flight phase can correspond to a climb phase after a take-off, to a cruising flight phase, to a descent phase during a landing, etc. In the case of a military transport airplane, the flight phase can also correspond to tactical operations, such as a low-altitude flight, a parachute drop, rescue operations, etc. In a particular embodiment, the coefficient K is chosen from the set of predetermined vertical centering coefficients, as a function also of a slope associated with the reference point. This slope can be computed by the device 10 as a function of the vertical flight profile: it is for example equal to the slope of a tangent to the vertical flight profile, at the reference point 32. This slope makes it possible to determine whether the aircraft is in a climb phase or in a descent phase.

The different coefficients K of the set of vertical centering coefficients are predetermined so as to define a plurality of vertical centerings, each optimized as a function of a flight phase and/or of a slope associated with the reference point. These vertical centerings are optimized so as to facilitate the viewing, by the pilot, of the vertical flight profile relative to elements of the environment that are relevant to the flight phase concerned. These predetermined coefficients can notably be stored in a memory of the device 10 for displaying a vertical flight profile.

Figure 4:
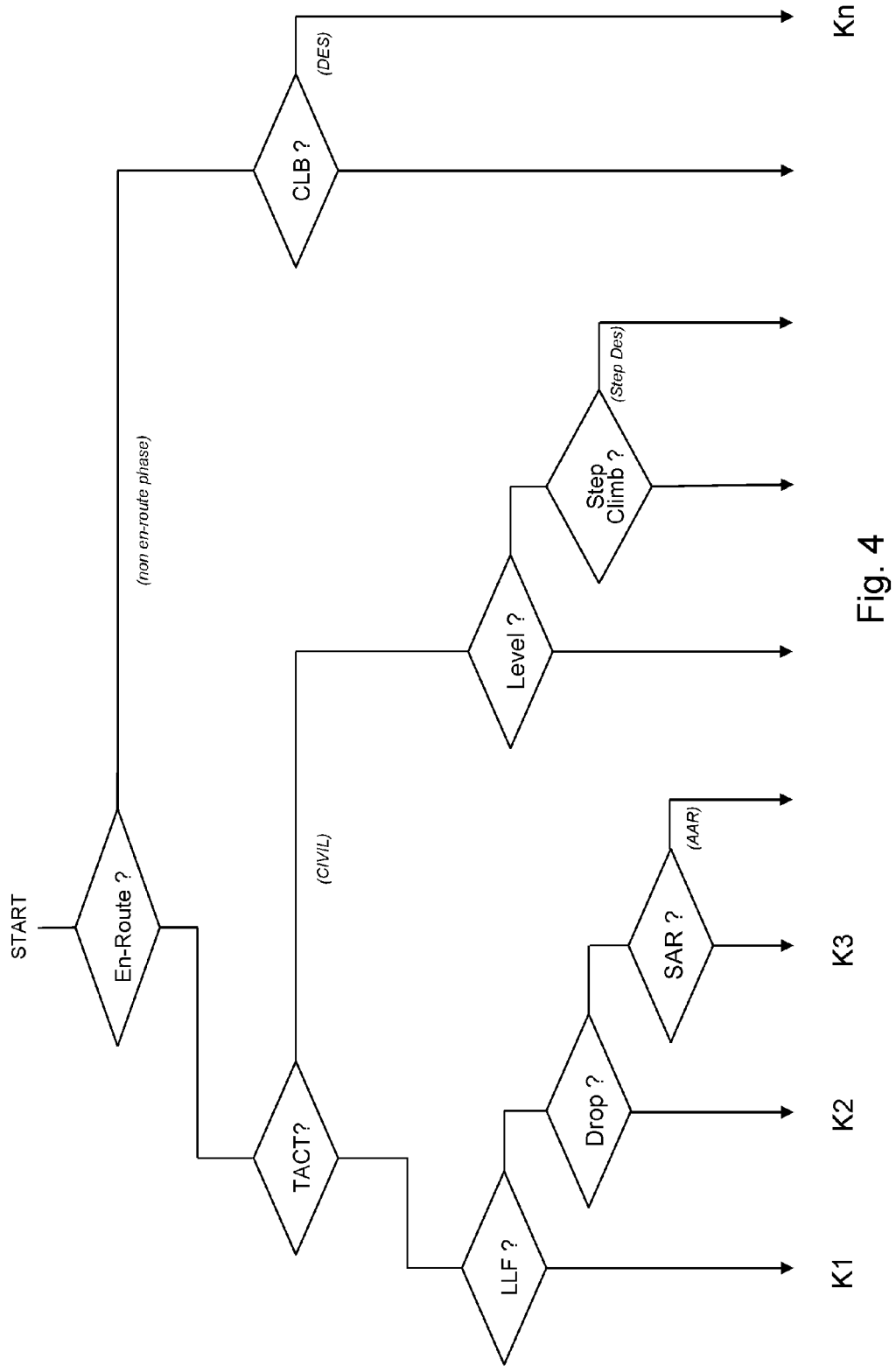
FIG. 4 illustrates an example of vertical centering algorithm for the display window.

In one embodiment, the device 10 for displaying a vertical flight profile uses the algorithm represented in FIG. 4 to determine the coefficient K for a selected reference point. The coefficient K is chosen by the algorithm from a set of predetermined vertical centering coefficients K1, K2, K3, . . . Kn. In this figure, the rhomboids correspond to test steps. If the condition indicated in the rhomboid is true, the algorithm continues via the branch situated at the bottom part of the rhomboid. Otherwise, the algorithm continues via the branch situated to the right of the rhomboid. The algorithm begins at a start point. In the first step, the algorithm checks whether the flight phase associated with the reference point is a cruising flight phase ("en-route"). If such is not the case, it checks whether it is a climb phase ("CLB"). If it is not a climb phase, it is a descent phase because the assumption of a cruising phase has already been discarded. The algorithm chooses a different coefficient K depending on whether it is a climb or a descent. To check whether it is a climb phase, the algorithm can use a slope information item as mentioned previously. When the flight phase is a cruising phase (in the first step), the algorithm continues by checking whether this flight phase is of tactical type (TACT). If such is not the case, it is a civil flight phase and, in this case, the algorithm checks whether the cruising flight is at constant flight level ("level"). If yes, it chooses the corresponding coefficient K. If not, it is a flight level change phase and the algorithm then checks whether it is a climbing level change step ("step climb"). If yes, the algorithm chooses the corresponding coefficient K. If not, it is a descending level change step and the algorithm chooses the corresponding coefficient K. When the flight phase is of tactical type, the algorithm checks whether it is a low altitude flight ("LLF=low level flight"), a parachute drop phase ("drop"), a rescue phase ("SAR=save and rescue") or an in-flight refueling phase ("AAR =air to air refueling"). Depending on the case, the algorithm chooses a coefficient K1, K2, K3, etc.

Figure 5A:
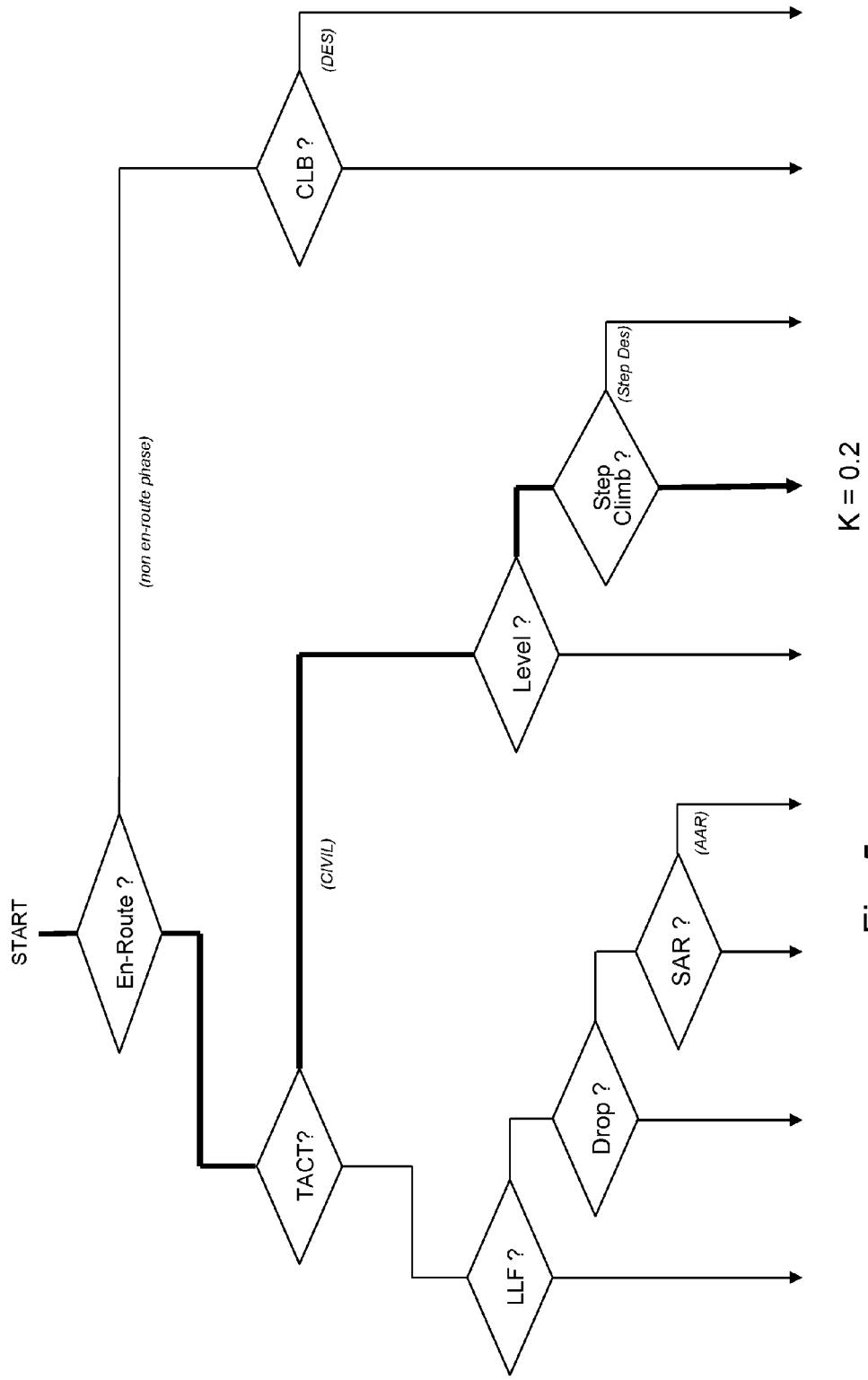
FIGS. 5a, 5b and 5c illustrate the application of the algorithm in three particular situations.
Figure 6A:
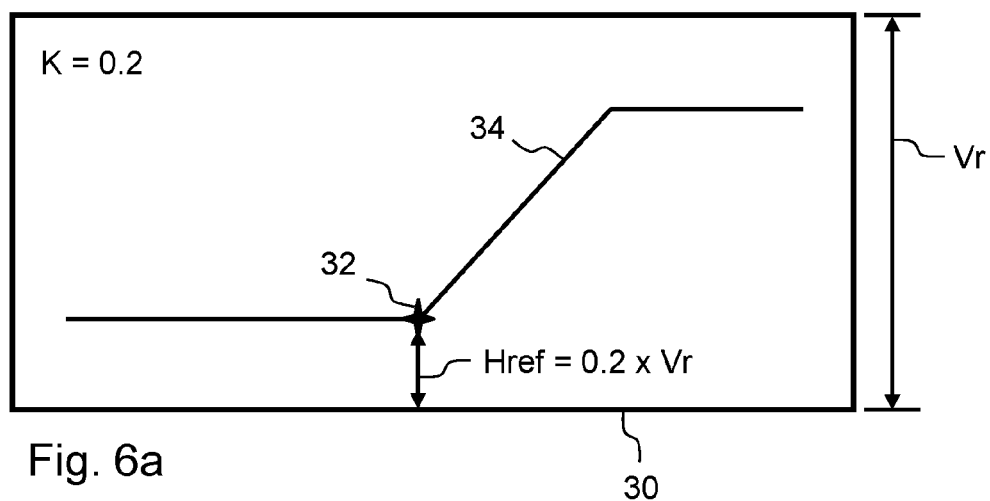
FIGS. 6a, 6b and 6c illustrate windows for displaying the vertical flight profile corresponding respectively to the three particular situations of FIGS. 5a, 5b and 5c.

FIG. 5a illustrates the application of the algorithm of FIG. 4 in the particular case of a first situation corresponding to a climbing level change during a civil cruising phase. The progress of the algorithm is represented by a bold line in the figure. The algorithm chooses a vertical centering coefficient K=0.2. The corresponding display window 30 is illustrated by FIG. 6a. The corresponding centering has the effect of placing the reference point 32 in a lower part of the window, so as to allow the pilot to correctly view the climbing level change resulting from the reference point 32. It nevertheless makes it possible to view the immediate environment below the reference point, so as to allow the pilot to check the absence of relief in proximity to the vertical flight profile 34.

Figure 5B:
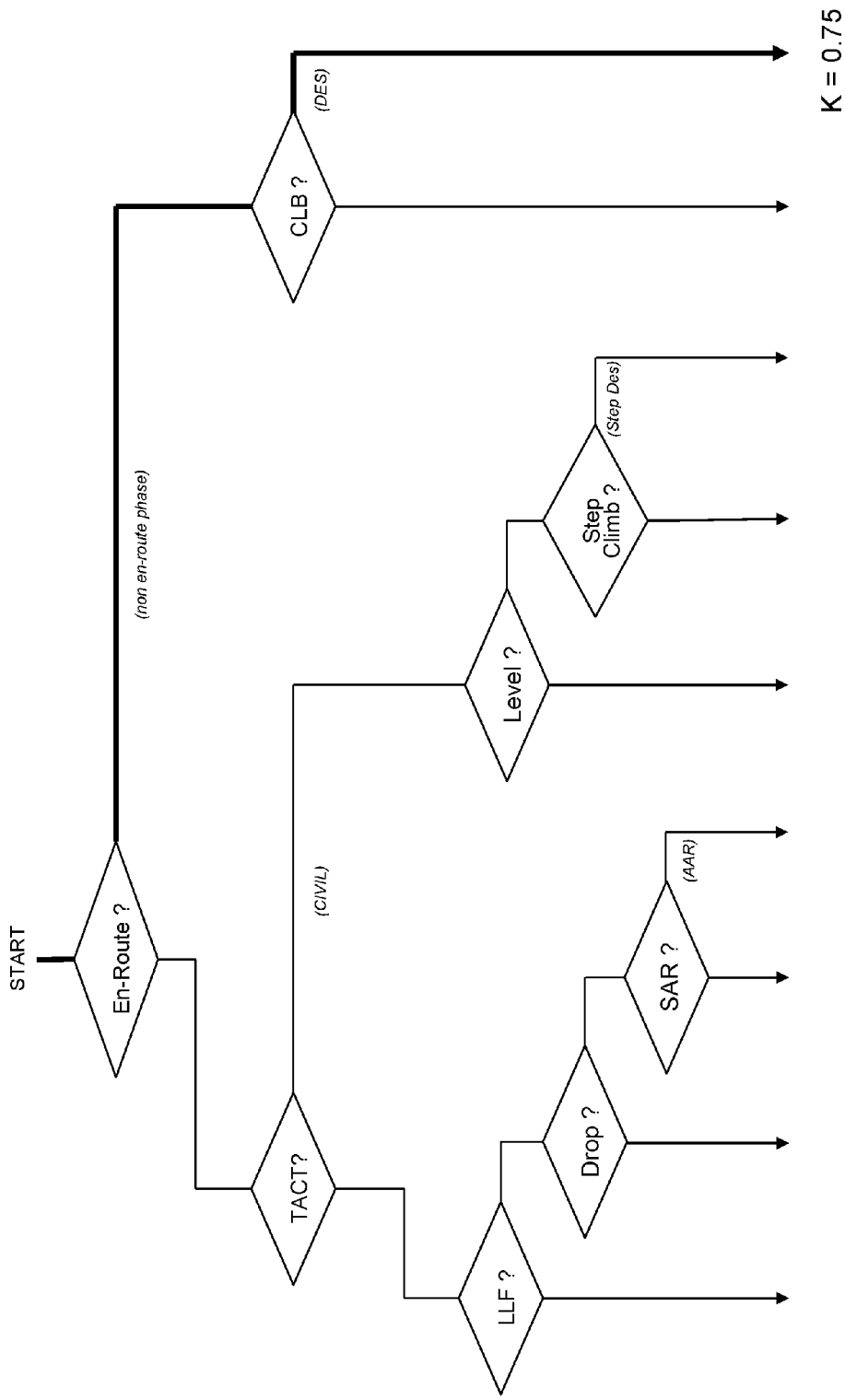
Figure 6B:
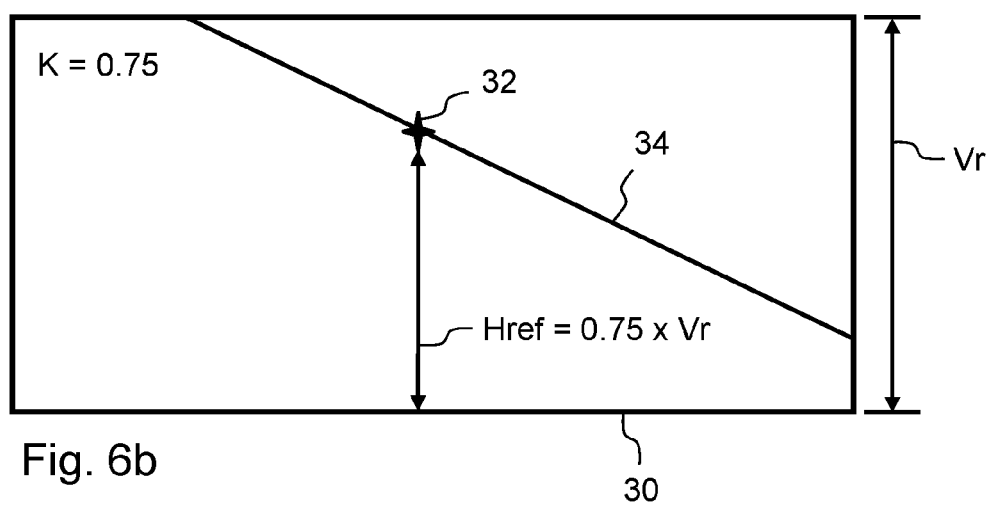

FIG. 5b illustrates the application of the algorithm in the case of a second situation corresponding to a descent phase during a landing of the aircraft. The progress of the algorithm is represented by a bold line in the figure. The algorithm chooses a vertical centering coefficient K=0.75. The corresponding display window 30 is illustrated by FIG. 6b. The corresponding centering has the effect of placing the reference point 32 in an upper part of the window, so as to allow the pilot to view both the vertical flight profile 34 and any relief situated under the vertical flight profile. The choice of such a coefficient also makes it possible to view enough of the vertical flight profile situated upstream of the reference point.

Figure 5C:
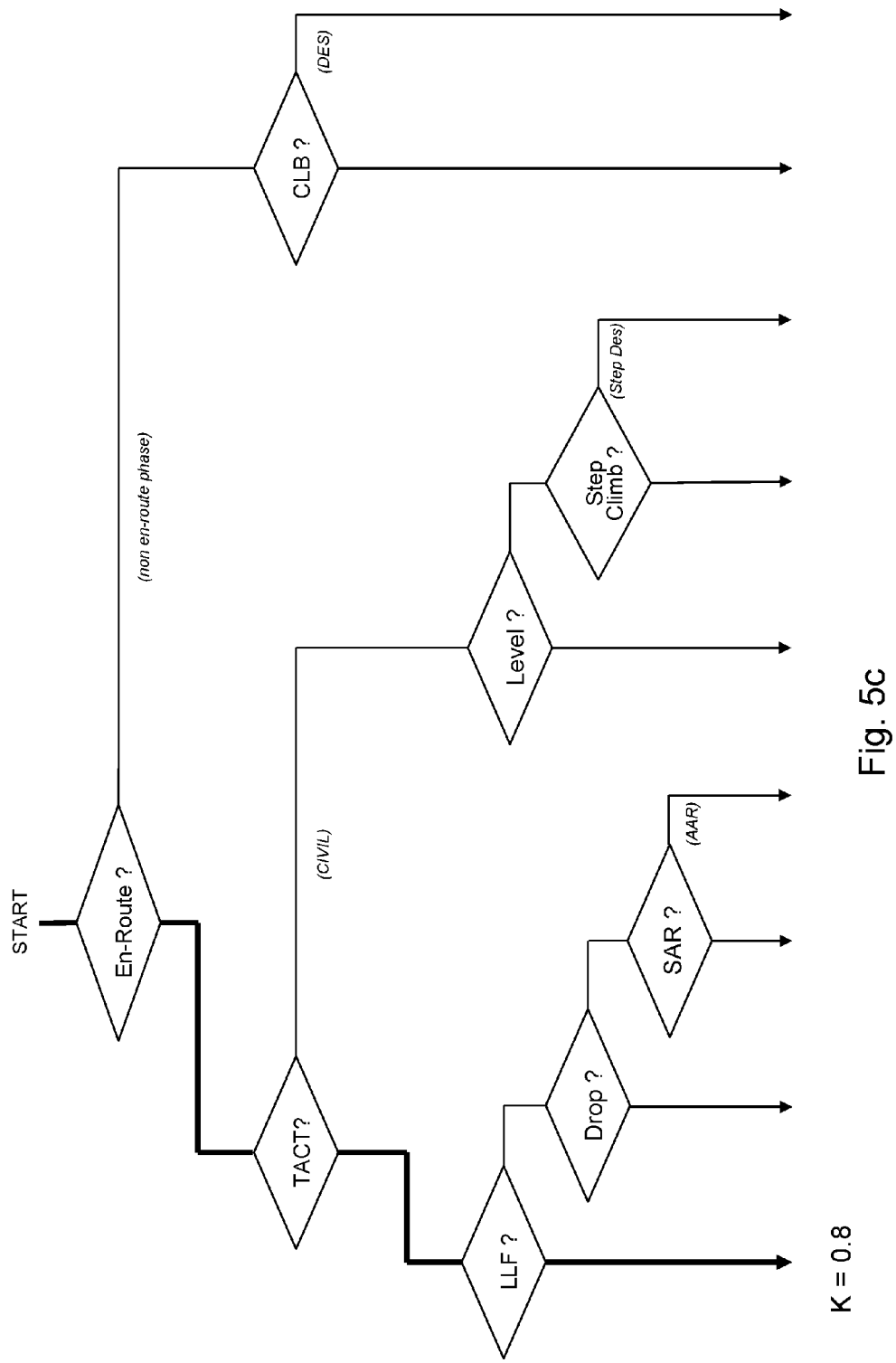
Figure 6C:
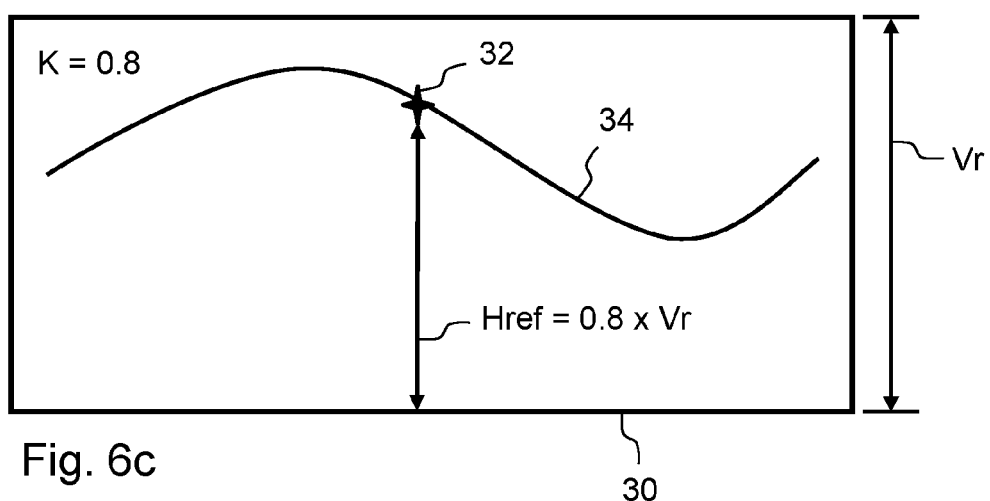

FIG. 5c illustrates the application of the algorithm in the case of a third situation corresponding to a low altitude flight phase. The progress of the algorithm is represented by a bold line in the figure. The algorithm chooses a vertical centering coefficient K=0.8. The corresponding display window 30 is illustrated by FIG. 6c. The corresponding centering has the effect of placing the reference point 32 in an upper part of the window, so as to allow the pilot to view both the vertical flight profile 34 and any relief situated under the vertical flight profile. The reference point is centered slightly higher, in the window 30, compared to the example of FIG. 6b. In effect, the slightly lower centering corresponding to FIG. 6b is justified by the visualization of the part of the vertical flight profile situated upstream of the reference point, while the aircraft is in a descent phase. In the case of a terrain following phase, the aircraft is not in such a descent phase and the reference point can therefore be centered slightly higher.

For reasons of clarity of the figures, the relief is not represented in the figures. However, the display window 30 can advantageously comprise a representation of the relief provided under the vertical flight profile, when the altitude of the relief corresponds to an altitude that can be represented in the window (that is to say an altitude lying between Zlow and Zlow+Vr). The relief information items necessary for this display can be supplied by a terrain database linked to the flight management computer 12.

In a particular embodiment, when the flight plan comprises an altitude constraint, the flight management computer 12 transmits an information item relating to this altitude constraint, via the link 22, to the device 10 for displaying a vertical flight profile which then makes the acquisition of the information. The device 10 then determines the coefficient K as a function, also, of the altitude constraint. For example, the device 10 determines a first value of the coefficient K out of a set of predetermined vertical centering coefficients, as explained previously. Then, it checks whether the altitude corresponding to the altitude constraint lies between Zlow and Zlow+Vr so as to be able to be viewed in the display window 30. If such is not the case, the device 10 checks whether the vertical display range Vr of the display window 30 makes it possible to simultaneously view the altitude of the reference point 32 and the altitude corresponding to the altitude constraint. In the affirmative the device 10 corrects the first value of the coefficient K so as to allow a display that is sufficiently visible to the pilot, in the window 30, of a symbol representative of the altitude constraint.

In an advantageous embodiment, the device 10 for displaying a vertical flight profile forms part of the flight management computer 12. The device 10 then corresponds to a function implemented by software in the flight management computer 12. That allows for a saving in weight and bulk. Furthermore, with the device 10 using a number of information items originating from the flight management computer, these information items can be exchanged by means of a shared memory rather than being transmitted by means of physical links. Other alternatives can however be envisaged: the device 10 can also be incorporated in the form of a function implemented by software of the display management system 16 or it can also be incorporated in a modular avionics computer of IMA (integrated modular avionics) type.

As indicated previously, with a flight plan being stored in the flight management computer 12, a pilot of the aircraft can view this flight plan in a window relating to the flight plan, on a screen of the cockpit. By virtue of the invention, he or she can also simultaneously view a corresponding vertical flight profile, on the display window 30 of the screen 18, whatever the current situation of the aircraft. Thus, the pilot uses the human-machine interface device 14 to select a waypoint of the flight plan for which he or she wants to view information. The flight management system 12 controls the display, in the window relating to the flight plan, of information items relating to the selected waypoint Similarly, the device 10 controls the display of the window 30 centered as a function of a reference point corresponding to the waypoint selected by the pilot. The pilot can thus navigate in a flight plan that he or she wants to check (or of which he or she wants to check a part), by successively selecting different waypoints of the flight plan by means of the human-machine interface device 14. The combination of the display of information in the window for displaying the flight plan and of the display of the vertical flight profile in the window 30 offers the pilot a contextualized display providing him or her with a better awareness of the situation corresponding to these different waypoints of the flight plan, whatever the current situation of the aircraft. Furthermore, the flight management computer can also control the display of a representation of a horizontal flight profile of the aircraft, in plan view about the waypoint concerned. This plan view representation can be displayed in an upper part of a navigation screen of ND (navigation display) type, the window 30 then being displayed in a lower part of the navigation screen. The window for displaying the flight plan can, for its part, be displayed on a screen of MFD (multifunction display) type associated with the human-machine interface device 14.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for displaying a vertical flight profile of an aircraft, the aircraft comprising:
   a display management system comprising at least one display screen in a cockpit of the aircraft,
   a flight management computer of the aircraft; and
   a human-machine interface device,
   said method comprising a step during which the flight management computer sends display instructions to the display management system, to control the display of a window relating to a flight plan of the aircraft on a screen of the cockpit,
   wherein said method comprises the following steps implemented by a device for displaying the vertical flight profile of the aircraft:
   a) acquiring, from the flight management computer of the aircraft, a reference point selected using the human-machine interface device from a plurality of waypoints of the flight plan of the aircraft;
   b) acquiring, from the flight management computer of the aircraft, a vertical flight profile of the aircraft comprising the reference point;
   c) computing, using said vertical flight profile, an altitude of the reference point;
   d) acquiring, from the flight management computer of the aircraft, at least one information item relating to a flight phase associated with the reference point;
   e) acquiring at least one information item relating to a selected display range;
   f) determining a vertical centering coefficient of a display window relating to the vertical flight profile of the aircraft, as a function at least of said information item relating to the flight phase associated with the reference point, the vertical centering coefficient corresponding to a vertical centering of the reference point in the display window; and
   g) transmitting, to the display management system, instructions for displaying the display window on this at least one display screen of the cockpit of the aircraft, these instructions comprising information items for displaying the vertical flight profile of the aircraft as a function at least of the altitude of the reference point and of the vertical centering coefficient of the display window.

2. The method as claimed in claim 1, wherein the vertical centering coefficient is determined by selection from a set of predetermined vertical centering coefficients.

3. The method as claimed in claim 1, wherein, in the step f), the vertical centering coefficient is determined, also, as a function of a slope associated with the reference point, this slope being computed as a function of the vertical flight profile acquired in the step b).

4. The method as claimed in claim 1, wherein the step d) further comprises the acquisition, from the flight management computer of the aircraft, of at least one information item relating to an altitude constraint of the vertical flight profile of the aircraft and, in the step f), the vertical centering coefficient is determined, also, as a function of said altitude constraint.

5. The method as claimed in claim 1, wherein the step g) further comprises the transmission, to the display management system, of at least one information item relating to the horizontal centering of the display window relative to the reference point.

6. The method as claimed in claim 1, wherein the device for displaying the vertical flight profile of the aircraft is incorporated in the flight management computer of the aircraft.

7. The method as claimed in claim 1, wherein the flight management computer of the aircraft is configured to send display instructions to the display management system, to control the display of a window relating to a horizontal flight profile of the aircraft on a screen of the cockpit.

8. A device for displaying a vertical flight profile of an aircraft, the aircraft comprising:
a display management system comprising at least one display screen in a cockpit of the aircraft,
a flight management computer of the aircraft; and
a human-machine interface device,
the flight management computer being configured to send display instructions to the display management system, so as to control the display of a window relating to a flight plan of the aircraft on a screen of the cockpit, wherein said device is configured to implement the following steps:
a) acquiring, from the flight management computer of the aircraft, a reference point selected using the human-machine interface device from a plurality of waypoints of the flight plan of the aircraft;
b) acquiring, from the flight management computer of the aircraft, a vertical flight profile of the aircraft comprising the reference point;
c) computing, using said vertical flight profile, an altitude of the reference point;
d) acquiring, from the flight management computer of the aircraft, at least one information item relating to a flight phase associated with the reference point;
e) acquiring at least one information item relating to a selected display range (Vr, Lr);
f) determining a vertical centering coefficient of a display window relating to the vertical flight profile of the aircraft, as a function at least of said information item relating to the flight phase associated with the reference point, the vertical centering coefficient corresponding to a vertical centering of the reference point in the display window; and
g) transmitting, to the display management system, instructions for displaying the display window on this at least one display screen of the cockpit of the aircraft, these instructions comprising information items for displaying the vertical flight profile of the aircraft as a function at least of the altitude of the reference point and of the vertical centering coefficient of the display window.

9. The device as claimed in claim 8, wherein the device is incorporated in the flight management computer of the aircraft.

10. An aircraft comprising:
a display management system comprising at least one display screen in a cockpit of the aircraft,
a flight management computer of the aircraft; and
a human-machine interface device, a display device as claimed in claim 8.

11. A system for displaying a vertical flight profile of an aircraft, this system comprising:
a display management system of the aircraft, comprising at least one display screen in a cockpit of the aircraft,
a flight management computer of the aircraft; and
a human-machine interface device,
the flight management computer being configured to send display instructions to the display management system, so as to control the display of a window relating to a flight plan of the aircraft on a screen of the cockpit,
wherein the system comprises a device for displaying a vertical flight profile configured to implement the following steps:
a) acquiring, from the flight management computer of the aircraft, a reference point selected using the human-machine interface device from a plurality of waypoints of the flight plan of the aircraft;
b) acquiring, from the flight management computer of the aircraft, a vertical flight profile of the aircraft comprising the reference point;
c) computing, using said vertical flight profile, an altitude of the reference point;
d) acquiring, from the flight management computer of the aircraft, at least one information item relating to a flight phase associated with the reference point;
e) acquiring at least one information item relating to a selected display range;
f) determining a vertical centering coefficient of a display window relating to the vertical flight profile of the aircraft, as a function at least of said information item relating to the flight phase associated with the reference point, the vertical centering coefficient corresponding to a vertical centering of the reference point in the display window; and
g) transmitting, to the display management system, instructions for displaying the display window on this at least one display screen of the cockpit of the aircraft, these instructions comprising information items for displaying the vertical flight profile of the aircraft as a function at least of the altitude of the reference point and of the vertical centering coefficient of the display window.

12. An aircraft comprising a system for displaying a vertical flight profile as claimed in claim 11.

* * * * *